United States Patent
Nakashima et al.

(10) Patent No.: US 12,344,751 B2
(45) Date of Patent: Jul. 1, 2025

(54) ACTIVE ENERGY RAY-CURABLE INKJET INK COMPOSITION

(71) Applicant: SAKATA INX CORPORATION, Osaka (JP)

(72) Inventors: Okinori Nakashima, Osaka (JP); Takuya Myose, Osaka (JP); Jun Kawabata, Osaka (JP); Koki Ogasahara, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 119 days.

(21) Appl. No.: 18/550,942

(22) PCT Filed: Dec. 14, 2021

(86) PCT No.: PCT/JP2021/045923
§ 371 (c)(1),
(2) Date: Sep. 15, 2023

(87) PCT Pub. No.: WO2022/201664
PCT Pub. Date: Sep. 29, 2022

(65) Prior Publication Data
US 2024/0141192 A1    May 2, 2024

(30) Foreign Application Priority Data
Mar. 25, 2021 (JP) .................. 2021-052267

(51) Int. Cl.
*C09D 11/322* (2014.01)
*C09D 11/101* (2014.01)

(52) U.S. Cl.
CPC .......... *C09D 11/322* (2013.01); *C09D 11/101* (2013.01)

(58) Field of Classification Search
CPC ...... C09D 11/101; C09D 11/322; C09D 4/00; C09D 11/30; C09D 11/40; C09D 11/037; C09D 11/104; C09D 11/54; B41J 2/01; B41J 11/00214; B41J 2/2107; B41J 11/002; B41J 2/21; B41M 5/0023; B41M 7/0081; B41M 5/0047
See application file for complete search history.

(56) References Cited

U.S. PATENT DOCUMENTS

| | | | |
|---|---|---|---|
| 6,140,019 A | 10/2000 | Sakurai et al. | |
| 9,238,745 B2 | 1/2016 | Hall et al. | |
| 2003/0083396 A1 | 5/2003 | Ylitalo et al. | |
| 2012/0083545 A1 | 4/2012 | Kida et al. | |
| 2016/0340529 A1 | 11/2016 | Lawrence et al. | |
| 2018/0030290 A1* | 2/2018 | Hirose | B41J 11/00214 |
| 2020/0148903 A1* | 5/2020 | Sato | B41J 2/01 |
| 2021/0024762 A1 | 1/2021 | Nakashima et al. | |
| 2021/0155813 A1 | 5/2021 | Nakashima et al. | |

FOREIGN PATENT DOCUMENTS

| | | |
|---|---|---|
| CN | 111954701 A | 11/2020 |
| EP | 1033626 A1 | 9/2000 |
| JP | H11100529 A | 4/1999 |
| JP | 2004536925 A | 12/2004 |
| JP | 2009067955 A | 4/2009 |
| JP | 2012092291 A | 5/2012 |
| JP | 2018095739 A | 6/2018 |
| JP | 2019031618 A | 2/2019 |
| JP | 2019172869 A | 10/2019 |
| JP | 2019183018 A | 10/2019 |
| JP | 2020023620 A | 2/2020 |
| JP | 2020084102 A | 6/2020 |

OTHER PUBLICATIONS

International Search Report (ISR) mailed Jan. 18, 2022, issued for International application No. PCT/P2021/045923. (2 pages).
Extended European Search Report (EESR) dated Feb. 14, 2025, issued for European counterpart patent application No. EP21933257.4 (6 pages).
International Preliminary Report on Patentability, dated Sep. 12, 2023, for corresponding international application PCT/JP2021/045923 (1 page).
Notification Concerning Transmittal of International Preliminary Report on Patentability, mailed Oct. 5, 2023, for corresponding international application PCT/JP2021/045923 (1 page).
Notification of Transmittal of Translation of the International Preliminary Report on Patentability, mailed Oct. 5, 2023, for corresponding international application PCT/JP2021/045923 (1 page).
Written Opinion of the International Searching Authority, mailed Jan. 18, 2022, for corresponding international application PCT/JP2021/045923 (3 pages).
A Notice of Examination Opinion issued by Taiwan Intellectual Property Bureau, Ministry of Economic Affairs on Apr. 29, 2025, for Taiwan counterpart application No. 110149241 (6 pages).

* cited by examiner

*Primary Examiner* — Jannelle M Lebron
(74) *Attorney, Agent, or Firm* — Law Office of Katsuhiro Arai

(57) ABSTRACT

An active energy ray-curable inkjet ink composition contains a pigment which contains Pigment Orange 71 and Pigment Violet 19 which is 30.0 to 85.0% by mass relative to a total mass of Pigment Violet 19 and Pigment Orange 71, and a photopolymerizable compound which contains, in a total amount of all polymerizable components,(A) 0.20 to 15.0% by mass of a multifunctional amine-modified oligomer; (B) 50.0% by mass or more of a monofunctional monomer; (C) 35.0% by mass or more of a monofunctional monomer whose glass transition temperature is 20° C. or more; (D) 35.0% by mass or more of a monofunctional monomer whose glass transition temperature is 10° C. or less; (E) 2.0 to 11.0% by mass of a multifunctional monomer whose glass transition temperature is 10° C. or less; and (F) 10.0 to 25.0% by mass of a nitrogen-containing monofunctional monomer.

8 Claims, No Drawings

ACTIVE ENERGY RAY-CURABLE INKJET INK COMPOSITION

CROSS-REFERENCE TO RELATED APPLICATIONS

This application is the U.S. National Phase under 35 U.S.C. § 371 of International Application PCT/JP2021/045923, filed Dec. 14, 2021, which claims priority to Japanese Patent Application No. JP2021-052267, filed Mar. 25, 2021. The International Application was published under PCT Article 21 (2) in a language other than English.

TECHNICAL FIELD

The present invention relates to an active energy ray-curable inkjet ink composition and a printing method.

BACKGROUND ART

Patent Literature 1 describes an inkjet ink containing Pigment Violet 19.

Patent Literature 2 describes an ink composition containing any one of Pigment Orange 43, Pigment Green 36, and Pigment Violet 23.

Patent Literature 3 describes an inkjet ink composition containing at least one type of organic pigment producing orange, violet, or green colors.

And, the ink compositions containing singly Pigment Orange or Pigment Violet are known as described in these patent literatures.

Additionally, an active energy ray-curable inkjet printing ink composition is also known, which contains monofunctional and multifunctional photopolymerizable compounds and oligomers as described in Patent Literature 4.

According to this active energy ray-curable inkjet printing ink composition, while it has excellent effects in various aspects such as storage stability, effectiveness, and tackiness, it is not confirmed that it can be used for various base materials, and no consideration is given for the possibility of using other base materials of polycarbonate and polyvinyl chloride, or improving hardness, rub resistance, and water resistance of a cured coating film.

That is, it is not intended to be usable for base materials of a wider variety of materials as an active energy ray-curable inkjet ink composition, or to allow a cured coating film to be usable in a wider range of situations, such as higher hardness as well as rub resistance and water resistance.

Therefore, depending on the application or usage environment of a base material where a coating film is formed using the active energy ray-curable inkjet ink composition, it may not be adequately applicable.

BACKGROUND ART LITERATURE

Patent Literature

Patent Literature 1: Japanese Patent Laid-open No. 2018-95739
Patent Literature 2: Japanese Patent Laid-open No. 2020-84102
Patent Literature 3: Japanese Patent Laid-open No. 2009-67955
Patent Literature 4: Japanese Patent Laid-open No. 2019-31618

SUMMARY OF THE INVENTION

Problems to Be Solved by the Invention

The ink compositions containing singly Pigment Orange or Pigment Violet are known as described in the above Patent Literatures.

However, with these ink compositions, it was difficult to achieve a balance between a more appropriate optical density and a b* value as a magenta ink composition. An object of the present invention is to obtain an active energy ray-curable inkjet ink composition which is designed to improve color development property and to be curable with an LED, and which is designed so that a cured coating layer can have high hardness and excellent rub resistance and water resistance.

Means for Solving the Problems

After studying in earnest to achieve the aforementioned object, the inventors of the present invention found that the aforementioned object could be achieved by an active energy ray-curable inkjet ink composition having a specific pigment composition, and eventually completed the present invention.

Effects of the Invention

These contribute to effects of sufficient curing by an active energy ray whose light source is an LED, high hardness of a formed coating film, and excellent rub resistance and water resistance.

Mode for Carrying Out the Invention

The active energy ray-curable inkjet ink composition of the present invention is described below.

First, a glass transition temperature in the present invention is defined as follows.

<Glass Transition Temperature>

Under the present invention, the glass transition temperature of a resin, when the resin is an acrylic-based copolymer resin, is a theoretical glass transition temperature obtained by Wood's equation below.

Wood's equation: $1/Tg = W1/Tg1 + W2/Tg2 + W3/Tg3 + \cdots + Wx/Tgx$

[In the equation, Tg1 to Tgx represent the glass transition temperatures of homopolymers comprising the resin's constituent monomers 1, 2, 3 . . . x, respectively, W1 to Wx represent the polymerization ratios of monomers 1, 2, 3 . . . x, respectively, and Tg represents the theoretical glass transition temperature. It should be noted that, in Wood's equation, glass transition temperatures are absolute temperatures.]

<Pigment>

The active energy ray-curable inkjet ink composition of the present invention contains Pigment Violet 19 and Pigment Orange 71.

Specifically, Pigment Violet 19 is 30.0 to 85.0% by mass relative to a total mass of Pigment Violet 19 and Pigment Orange 71. Especially, Pigment Violet 19 is preferably 40.0% by mass or more, more preferably 45.0% by mass or more, even more preferably 50.0% by mass or more, and most preferably 55.0% by mass or more.

Also, Pigment Violet 19 is also preferably 83.0% by mass or less, more preferably 75.0% by mass or less, even more preferably 70.0% by mass or less, and most preferably 65.0% by mass or less.

As long as a content ratio of Pigment Violet 19 and Pigment Orange 71 falls within the above range, a printed part is excellent in red color development property.

A total amount of Pigment Violet 19 and Pigment Orange 71, relative to a total amount of all polymerizable components of the ink composition, is preferably 2.0% by mass or more, more preferably 3.0% by mass or more, and even more preferably 4.0% by mass or more from the viewpoint of improving the color development property of the printed area. Also, the total amount is preferably 10.0% by mass or less, more preferably 8.0% by mass or less, and even more preferably 7.0% by mass or less from the viewpoint of improving discharge stability.

Although it is necessary to employ the above specific pigment as the pigment in the present invention, a different pigment may be contained as long as the effects of the present invention are not impaired. Examples of the different pigments are organic pigments and inorganic pigments other than Pigment Violet 19 and Pigment Orange 71 used for an inkjet ink composition.

Examples of the organic pigments may include dye lake pigments, azo-based pigments, benzimidazolone-based pigments, phthalocyanine-based pigments, quinacridone-based pigments, anthraquinone-based pigments, dioxazine-based pigments, indigo-based pigments, thioindigo-based pigments, perylene-based pigments, perinone-based pigments, diketopyrrolopyrrole-based pigments, isoindolinone-based pigments, nitoro-based pigments, nitroso-based pigments, flavanthrone-based pigments, quinophthalone-based pigments, pyranthrone-based pigments, and indanthrone-based pigments. Examples of the inorganic pigments may include carbon black, titanium oxide, zinc oxide, red iron oxide, graphite, iron black, chrome oxide green, and aluminum hydroxide. These pigments may be ones which have been subjected to a surface treatment using a well-known surface treatment agent.

Specific examples of each of representative hues of the above pigments may include the following.

Examples of yellow pigments may include C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, and 213.

Examples of magenta pigments may include C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, and 270.

Examples of cyan pigments may include C. I. Pigment Blue 1, 2, 3, 15, 15:1, 15:2, 15:3, 15:4 15:6, 16, 18, 22, 27, 29, and 60.

Examples of orange pigments may include C. I. Pigment Orange 1, 2, 3, 4, 5, 13, 15, 16, 17, 19, 24, 31, 34, 36, 38, 40, 43, 46, 48, 49, 51, 60, 61, 62, 64, 65, 66, 67, 68, 69, 72, 73, 74, and 81.

Examples of violet pigments may include C. I. Pigment Violet 1, 2, 3, 3:1, 3:3, 5:1, 13, 17, 23, 25, 27, 29, 31, 32, 36, 37, 38, 42, and 50.

Examples of black pigments may include carbon black (C. I. Pigment Black 7).

Examples of white pigments may include titanium oxide and aluminum oxide, which may be subjected to a surface treatment with various materials, such as alumina and silica.

<Pigment Dispersant>

A pigment dispersant is preferably used in the active energy ray-curable inkjet ink composition of the present invention.

The pigment dispersant is used for improving dispersibility of the pigment and storage stability of the active energy ray-curable inkjet ink composition. Conventionally used pigment dispersants are usable without any particular restriction. Among them, polymer pigment dispersants are preferably used. The pigment dispersants may be used alone, or in combination of two or more types.

Examples of the polymer pigment dispersants may include carbodiimide-based dispersants, polyester amine-based dispersants, fatty acid amine-based dispersants, modified polyacrylate-based dispersants, modified polyurethane-based dispersants, multichain polymeric nonionic-based dispersants, and polymeric ionic activators.

Examples of these polymer pigment dispersants may include BYKJET-9150, BYKJET-9151, BYKJET-9170, DISPERBYK-168, DISPERBYK-190, DISPERBYK-198, DISPERBYK-2010, DISPERBYK-2012, and DISPERBYK-2015 (BYK-Chemie GmbH), SMA1440, SMA2625, SMA17352, SMA3840, SMA1000, SMA2000, and SMA3000 (Cray Valley), JONCRYL67, JONCRYL678, JONCRYL586, JONCRYL611, JONCRYL680, JONCRYL682, JONCRYL690, JONCRYL819, JONCRYLJDX5050, EFKA4550, EFKA4560, EFKA4585, EFKA4701, EFKA5220, and EFKA6230 (BASF SE), SOLSPERSE20000, SOLSPERSE27000, SOLSPERSE41000, SOLSPERSE41090, SOLSPERSE43000, SOLSPERSE44000, SOLSPERSE46000, SOLSPERSE47000, SOLSPERSE54000, and SOLSPERSE56000 (Lubrizol Corporation), AjispurPB821, AjispurPB822, AjispurPB824, and AjispurPB881 (Ajinomoto Fine-Techno Co., Inc.).

A content of a pigment dispersant is preferably 1.0% by mass or more, more preferably 5.0% by mass or more, also preferably 100% by mass or less, and more preferably 60% by mass or less, relative to a total mass of pigments, from the viewpoint of enhancing the dispersibility of the pigments and the storage stability of the active energy ray-curable inkjet ink composition.

<(A) Multifunctional Amine-Modified Oligomers>

No particular limitation is imposed on a multifunctional amine-modified oligomer contained in a photopolymerizable compound as long as it is a multifunctional amine-modified (meth)acrylate oligomer having at least one amino group and at least two(meth)acryloyl groups in a molecule. Although no particular limitation is imposed thereon as long as the number of the (meth)acryloyl groups included in the molecule of the multifunctional amine-modified (meth)acrylate oligomer is 2 or more, the number thereof is preferably 2 or more but 6 or fewer, and more preferably 2 or more but 4 or fewer. As long as the number of the (meth)acryloyl groups falls within the above range, the multifunctional amine-modified (meth)acrylate oligomer reacts readily with a polymerizable compound, and the viscosity of the active energy ray-curable inkjet ink composition tends to fall within an appropriate range.

The multifunctional amine-modified (meth)acrylate oligomer may be a synthetic made by polymerization of a desired monomer, or may be a commercially available product. Examples thereof may include GENOMER5161 and GENOMER5275 (RAHN AG), CN371, CN371NS, CN373, CN383, CN384, CN386, CN501, CN503, CN550, and CN551 (Sartomer Inc.), EBECRYL80, EBECRYL81, EBECRYL83, EBECRYL7100, EBECRYL84, and EBECRYLP115 (DAICEL-ALLNEX LTD.), LAROMER PO 83F, LAROMER PO 84F, Laromer LR8946, Laromer LR8956, Laromer LR8996, and Laromer LR8894 (BASF SE), AgiSyn001, AgiSyn002, Agisyn003, and Agisyn008 (DSM Coating Resins Ltd.), Photomer4771, Photomer4775, Photomer4967, Photomer5096, Photomer5662, and Photomer5930 (Cognis), DoublecureEPD, DoublecureOPD, Doublecure115, Doublecure225, Doublecure645, PolyQ222, PolyQ226, PolyQ224, and PolyQ101 (Double Bond Chemical Ind., Co., Ltd.). Among them, an oligomer having two photopolymerizable functional groups in a molecule is preferable, and it is more preferable that the photopolymerizable functional group is a (meth)acryloyl group.

A multifunctional amine-modified (meth)acrylate oligomer that can be used in the present invention accounts for 0.20 to 15.0% by mass relative to a total amount of all polymerizable components of the active energy ray-curable inkjet ink composition. Particularly, it accounts for preferably 0.40% by mass or more, even more preferably 0.50% by mass or more. Also, it accounts for preferably 10.0% by mass or less, more preferably 5.0% by mass or less, and even more preferably 1.00% or less.

Although the viscosity of the multifunction amine-modified oligomer is not limited, it is particularly preferable that a viscosity at 25° C. is 2000 cps or less in order that an overall viscosity of the active energy ray-curable inkjet ink composition can be kept within an appropriate range.

Additionally, for example, an epoxy (meth)acrylate oligomer may be contained as long as the effects of the present invention are not impaired.

The epoxy (meth)acrylate oligomer may be a synthetic made by polymerization of a desired monomer, or may be a commercially available product. Examples thereof may include EBECRYL3708, and EBECRYL1606 ((DAICEL-CYTEC COMPANY, LTD.), CN116, CN120B60, CN120M50, CN131B, CN132, CN137, CN152, CN153, CN2102E, and CN2003 (Sartomer Inc.)

<(B) Monofunctional Monomers>

Examples of monofunctional monomers contained in a photopolymerizable compound may include the following: Alkyl(meth)acrylates, such as methyl(meth)acrylate, etyl (meth)acrylate, propyl(meth)acrylate, butyl(meth)acrylate, isobutyl(meth)acrylate, t-butyl(meth)acrylate, isoamyl (meth)acrylate, octyl(meth)acrylate, isooctyl acrylate, 2-ethylhexyl(meth)acrylate, decyl(meth)acrylate, isodecyl(meth) acrylate, tridecyl(meth)acrylate, isomyristyl(meth)acrylate, stearyl(meth)acrylate, isostearyl(meth)acrylate, isobornyl (meth)acrylate, and lauryl(meth)acrylate.

(Meth)acrylates containing a cyclic hydrocarbon group, such as cyclohexyl(meth)acrylate, butylcyclohexyl acrylate, trimethylcyclohexyl acrylate, adamantly(meth)acrylate, dicyclopentanyl(meth)acrylate, and dicyclopentenyl(meth) acrylate.

Alkoxyalkyl(meth)acrylates, such as ethyl carbitol(meth) acrylate, ethoxyethyl(meth)acrylate, 2-methoxyethyl acrylate, and butoxyethyl(meth)acrylate.

(Meth)acrylates having a hydroxy group or ether bond, such as hydroxymethyl(meth)acrylate, hydroxyethyl(meth) acrylate, hydroxypropyl(meth)acrylate, 4-hydroxybutyl (meth)acrylate, polyethylene glycol(meth)acrylate, hydroxybutyl(meth)acrylate, hydroxyphenoxypropyl(meth) acrylate, 2-(2-ethoxyethoxy)ethyl acrylate, 2-ethylhexyl-diglycol(meth)acrylate, 2-acryloyloxyethylhexahydrophthalic acid, butoxyethyl acrylate, ethoxydiethylene glycol (meth)acrylate, diethylene glycol monoethyl ether(meth) acrylate, caprolactone(meth)acrylate, ethyl carbitol acrylate, methoxydiethylene glycol(meth)acrylate, butoxydiethylene glycol(meth)acrylate, butoxytriethylene glycol(meth)acrylate, methoxytriethylene glycol(meth)acrylate, 2-ethylhexyl-diglycol acrylate, and phenoxydiethylene glycol (meth)acrylate.

(Meth)acrylic acid esters of polyalkylene glycol monoalkyl ether, such as methodypolyethylene glycol(meth)acrylate and methoxypropylene glycol(meth)acrylate.

(Meth)acrylic acid ester of polyalkylene glycol monoaryl ether, e.g., hexaethylene glycol monophenyl ether, (meth) acrylates having a hydoxy group, e.g., glycerol(meth)acrylate and 2-hydroxyethyl(meth)acrylate, (meth)acrylates having a heterocyclic structure, e.g., tetrahydrofurfuryl(meth) acrylate, (2-methyl-2-ethyl-1,3-dioxolane-4-yl)methyl (meth)acrylate, (3-ethyloxetan-3-yl)methyl methacrylate, caprolactone-modified tetrahydrofurfuryl(meth)acrylate, and cyclic trimethylolpropane formal(meth)acrylate.

Compounds, such as phenol ethylene glycol-modified acrylate, 2-hydroxypropyl(meth)acrylate, 2-hydroxy-3-phenoxypropyl(meth)acrylate, ethoxy phenyl acrylate (EO2 mol), ethoxy phenyl acrylate (EO1 mol), 2-acryloyloxyethyl succinate, 2-acryloyloxyethyl phthalate, 2-acryloyloxyethyl hexahydro phthalate, 2-acryloyloxyethyl-2-hydroxyethyl phthalate, lactone modified flexible acrylate, t-butylcyclohexyl(meth)acrylate, EO(ethylene oxide) modified succinate (meth)acrylate, vinyloxyethoxyethyl(meh)acrylate, methylphenoxyethyl(meth)acrylate, 2-phenoxyethyl(meth) acrylate and ethylene oxide modified product thereof, 2-ethylhexylcarbitol(meth)acrylate, ethylcaribitol(meth) acrylate, acryloylmorpholine, acrylonitrile, acrylamide, diethylacrylamide, styrene, benzyl(meth)acrylate, and (meth)acrylic acid.

Nitrogen-containing monomers, such as N-alkylol (C1 to 5)(meth)acrylamides, such as acryloylmorpholine and vinylcaprolactam, (meth)acrylamide, N-methoxymethyl acrylamide, diacetone acrylamide, N,N-dimethylacrylamide, N,N-diethylacrylamide, hydroxymethyl(meth)acryldiamide, di(2-hydroxyethyl)(meth)acrylamide, di(3-hydroxypropyl) (meth)acrylamide, and di(4-hydroxybutyl)(meth)acrylamide, and monofunctional monomers having an amide structure, e.g., 1 to 3 mol adduct of ethylene oxide or propylene oxide of the above N-alkylol (C1 to 5)(meth)acrylamides, N-vinyl carbazole, N-vinylacetamide, and N-vinylpyrrolidone.

Additionally, (B) monofunctional monomers in the present invention also include the following (C) monofunctional monomers whose glass transition temperature is 20° C. or more, (D) monofunctional monomers whose glass transition temperature is 10° C. or less, and (F) monomers listed above as a nitrogen-containing monofunctional monomer. Further, monofunctional monomers, which correspond to one or more types in (C) monofunctional monomers whose glass transition temperature is 20° C. or more, (D) monofunctional monomers whose glass transition temperature is 10° C. or less, and (F) nitrogen-containing monofunctional monomers, are identified as the corresponding components in (C), (D), and (F), and are also included in the monofunctional monomer in (B). Consequently, they are included when calculating the content ratios therein.

A monofunctional monomer is contained in the active energy ray-curable inkjet ink composition mainly for the purpose of reducing viscosity. The content of the monofunctional monomer is 50.0% by mass or more, preferably 80.0% by mass or more, more preferably 90.0% by mass or more, and even more preferably 95.0% by mass or more, relative to a total amount of all polymerizable components. The content is preferably 99.0% by mass or less, more preferably 98.0% by mass or less, and even more preferably 97.0% by mass or less.

In the case of containing monofunctional monomers having an amide structure, a content thereof is preferably 4.0% by mass or more, more preferably 8.0% by mass or more, even more preferably 12.0% by mass or more, and most preferably 14.0% by mass or more, relative to a total amount of all polymerizable components of the active energy ray-curable inkjet ink composition. It is also preferably 30.0% by mass or less, more preferably 25.0% by mass or less, even more preferably 20.0% by mass or less, and most preferably 18.0% by mass or less.

Among monofunctional monomers having an amide structure, it is preferable to contain vinylcaprolactam. A content of vinylcaprolactam is preferably 3.0% by mass or more, more preferably 6.0% by mass or more, even more preferably 10.0% by mass or more, and most preferably 13.0% by mass or more, relative to a total amount of all polymerizable components of the active energy ray-curable inkjet ink composition. It is also preferably 25.0% by mass or less, more preferably 22.0% by mass or less, even more preferably 20.0% by mass or less, and most preferably 18.0% by mass or less.

Among monofunctional monomers having an amide structure, it is preferable to contain acryloylmorpholine. A content of acryloylmorpholine is preferably 2.0% by mass or more, more preferably 3.0% by mass or more, even more preferably 4.0% by mass or more, and most preferably 5.0% by mass or more, relative to a total amount of all polymerizable components of the active energy ray-curable inkjet ink composition. It is also preferably 20.0% by mass or less, more preferably 10.0% by mass or less, even more preferably 8.0% by mass or less, and most preferably 7.0% by mass or less.

<(C) Monofunctional Monomers Whose Glass Transition Temperature is 20° C. or More>

As a monofunctional monomer whose glass transition temperature is 20° C. or more contained in the photopolymerizable compound, monofunctional monomers whose glass transition temperature is 20° C. or more are selected from among the above monofunctional monomers. Examples thereof may include methyl methacrylate, n-propyl methacrylate, stearyl(meth)acrylate, isobornyl(meth)acrylate, cyclic trimethylolpropane formal(meth)acrylate (CTFA), adamantly(meth)acrylate, dicyclopentanyl(meth)acrylate, dicyclopentenyl(meth)acrylate, styrene, acryloylmorpholine, acrylamide, N-vinylcaprolactam, (meth) acrylic acid, acrylonitrile, and vinyl acetate. One type or two or more types of these monomers may be used.

Among monofunctional monomers whose glass transition temperature is 20° C. or more, monofunctional monomers having the above amide structure and a compound having a cyclic structure are preferable. Besides monofunctional monomers having an amide structure, it is particularly desirable to contain one or more of isobornyl(meth)acrylate and cyclic trimethylolpropane formal acrylate from the viewpoint of obtaining better curing properties and adhesion of a coating film, and it is more preferable to contain N-vinylcaprolactam.

It is more preferable to contain 5.0% by mass or more of an acrylamide-based monomer and/or 5.0% by mass or more of N-vinylcaprolactam, relative to a total amount of all polymerizable components of monofunctional monomers whose glass transition temperature is 20° C. or more.

Also, among monofunctional monomers whose glass transition temperature is 20° C. or more, ones whose glass transition temperature is 50° C. or more are preferable, and ones whose glass transition temperature is 70° C. or more are more preferable.

It should be noted that 3,3,5-trimethylcyclohexyl acrylate may or may not be contained.

While a content of a monofunctional monomer whose glass transition temperature is 20° C. or more is 35.0% by mass or more relative to a total amount of all polymerizable components, preferably 38.0% by mass or more, more preferably 40.0% by mass or more, and even more preferably 42.0% by mass or more. Also, it is preferably 60.0% by mass or less, more preferably 55.0% by mass or less, and even more preferably 50.0% by mass or less. If the content of monofunctional monomers whose glass transition temperature is 20° C. or more is less than 35.0% by mass, curing properties of the active energy ray-curable inkjet ink composition of the present invention subjected to photocuring with an LED is deteriorated.

<(D) Monofunctional Monomers Whose Glass Transition Temperature is 10° C. or Less>

As monofunctional monomers whose glass transition temperature is 10° C. or less usable in the present invention, monofunctional monomers whose glass transition temperature is 10° C. or less are selected from among the above monofunctional monomers. Especially preferred examples thereof may include methyl acrylate, ethyl acrylate, n-butyl acrylate, n-hexyl methacrylate, 2-ethylhexyl(meth)acrylate, iso-nonyl acrylate, tetrahydrofurfuryl(meth)acrylate, isooctyl acrylate, isoamyl acrylate, isomyristyl acrylate, and lauryl acrylate. Two or more types of these monomers may be used in combination.

While a content of monofunctional monomers whose glass transition temperature is 10° C. or less is 35.0% by mass or more relative to a total amount of all polymerizable components, preferably 38.0% by mass or more, more preferably 45.0% by mass or more, and even more preferably 50.0% by mass or more. Also, it is preferably 70.0% by mass or less, more preferably 60.0% by mass or less, and even more preferably 55.0% by mass or less.

The viscosity of the active energy ray-curable inkjet ink composition of the present invention tends to become too high if the content of monofunctional monomers whose glass transition temperature is 10° C. or less is less than 35.0% by mass.

Also, among monofunctional monomers whose glass transition temperature is 10° C. or less, monomers whose glass transition temperature is −30° C. or less are preferable, and monomers whose glass transition temperature is −50° C. or less are more preferable.

<(E) Multifunctional Monomers Whose Glass Transition Temperature is 10° C. or Less>

As a multifunctional monomer whose glass transition temperature is 10° C. or less usable in the present invention, there are compounds having a plurality of carbon-carbon unsaturated bonds in a molecule. Examples thereof may include trimethylolpropane tri(meth)acrylate, dipropylene glycol diacrylate, vinyloxyethoxyethyl(meth)acrylate, EO (10 mol or 20 mol) modified bisphenol A diacrylate, polyethylene glycol (400)di(meth)acrylate, polyethylene glycol (600)diacrylate, alkoxylated hexanediol diacrylate, ethoxylated (30)bisphenol A diacrylate, alkoxylated neopentyl glycol diacrylate, ethoxylated (3)trimethylolpropane triacrylate, ethoxylated (6)trimethylolpropane triacrylate, ethoxylated (9)trimethylolpropane triacrylate, propoxylated (3)trimethylolpropane triacrylate, triethylene glycol dimethacrylate, tetraethylene glycol dimethacrylate, and polyethylene glycol (600)dimethacrylate.

While the content of multifunctional monomers whose glass transition temperature is 10° C. or less is 2.0 to 11.0% by mass relative to a total amount of all polymerizable components, preferably 3.0% by mass or more, and more preferably 4.0% by mass or more. Also, it is preferably 9.0% by mass or less, more preferably 7.0% by mass or less, and even more preferably 5.0% by mass or less.

If the content of multifunctional monomers whose glass transition temperature is 10° C. or less is less than 2.0% by mass, this may result in poor adhesion to individual base materials, and may also result in poor hardness, rub resistance, and water resistance of a coating film after being cured. If the content of multifunctional monomers whose glass transition temperature is 10° C. or less exceeds 11.0% by mass, this may result in poor adhesion to various types of base materials.

Also, among multifunctional monomers whose glass transition temperature is 10° C. or less, monomers whose glass transition temperature is −20° C. or less are preferable, and monomers whose glass transition temperature is −30° C. or less are more preferable.

It should be noted that α, β-unsaturated ether monomer may or may not be contained.

<(F) Nitrogen-Containing Monofunctional Monomers>

Examples of nitrogen-containing monofunctional monomers usable in the present invention may include acrylic amides, such as acryloylmorpholine, vinylcaprolactam, acrylonitrile, (meth)acrylamide, N-methoxymethylacrylamide, diacetone acrylamide, N,N-dimethylacrylamide, and diethylacrylamide, N-alkylol (C1 to 5)(meth)acrylamides, such as N-vinylcarbazole, N-vinylacetamide, N-vinylpyrrolidone, N,N-dimethyl(meh)acrylamide, N,N-diethyl(meth)acrylamide, hydroxymethyl(meth)acryldiamide, di(2-hydroxyethyl)(meth)acrylamide, di(3-hydroxypropyl)(meth)acrylamide, and di(4-hydroxybutyl)(meth)acrylamide, and 1 to 3 mole adducts of ethylene oxide or propylene oxide of these N-alkylol (C1 to 5)(meth)acrylamides, N-vinylcaprolactam, vinyl methyl oxazolidinone, caprolactone modified tetrahydrofurfuryl(meth)acrylate, (meth)acryloylpyrrolidine, (meth)acryloylpiperidine, cyclic trimethylolpropane formal(meth)acrylate, and lactone modified flexible acrylate.

While the content of the nitrogen-containing monofunctional monomer is preferably 10.0 to 25.0% by mass relative to a total amount of all polymerizable components, more preferably 12.0% by mass or more, and even more preferably 15.0% by mass or more.

Also, it is preferably 22.0% by mass or less, more preferably 20.0% by mass or less, and even more preferably 18.0% by mass or less.

If the content of nitrogen-containing monofunctional monomers is less than 10.0% by mass, this may result in poor curing properties when an LED is used as a light source. If the content exceeds 25.0% by mass, this may result in poor adhesion to various types of base materials.

(Other Polymerizable Components)

The active energy ray-curable inkjet ink composition of the present invention may contain, as other polymerizable components, oligomers that are not multifunctional amine modified oligomers, and multifunctional monomers whose glass transition temperature exceeds 10° C., as long as the effects of the present invention are not impaired.

(Multifunctional Monomers Whose Glass Transition Temperature Exceeds 10° C.)

Multifunctional monomers whose glass transition temperature exceeds 10° C. can be contained in the active energy ray-curable inkjet ink composition as long as the effects of the present invention are not impaired.

Examples of the above multifunction monomers are as follows. A large content thereof may result in poor adhesion to a base material.

Ethylene glycol di(meth)acrylate, propylene glycol di(meth)acrylate, butanediol di(meth)acrylate, hexanediol di(meth)acrylate, dipropylene glycol dimethacrylate, triethylene glycol di(meth)acrylate, tripropylene glycol di(meth)acrylate, 1,9-nonanediol di(meth)acrylate, neopentyl glycol di(meth)acrylate, dimetylol-tricyclodecane di(metha)acrylate, neopentylglycol hydroxypivalate di(meth)acrylate, polytetramethylene glycol diacrylate, trimethylolpropane tri(meth)acrylate and a modified ethylene oxide product thereof, pentaerythritol tri(meth)acrylate, pentaerythritol tetra(meth)acrylate and a modified ethylene oxide product thereof, dipentaerythritol penta(meth)acrylate and a modified ethylene oxide product thereof, dipentaerythritol hexa(meth)acrylate and a modified ethylene oxide product thereof, urethane(meth)acrylate, epoxy(meth)acrylate, polyester(meth)acrylate, pentaerythritol ethoxytetraacrylate, caprolactam-modified dipentaerythritol hexaacrylate, ethoxylated bisphenol A diacrylate, and alkoxylated tetrahydrofurfuryl acrylate.

(Photopolymerization Initiator)

The active energy ray-curable inkjet ink composition of the present invention contains a photopolymerization initiator. No particular limitation is imposed on the photopolymerization initiator as long as it initiates polymerization upon being exposed to active energy ray, and it is possible to use a photopolymerization initiator used for the active energy ray-curable inkjet ink composition.

Examples of photopolymerization initiators may include benzoin ether-based photopolymerization initiators, acetophenone-based photopolymerization initiators, α-ketol-based photopolymerization initiators, aromatic sulfonyl chloride-based photopolymerization initiators, photoactive oxime-based photopolymerization initiators, benzoin-based photopolymerization initiators, benzil-based photopolymerization initiators, benzophenone-based photopolymerization initiators, ketal-based photopolymerization initiators, thioxanthone-based photopolymerization initiators, triazine-based photopolymerization initiators, and acylphosphine oxide-based photopolymerization initiators. Among them, triazine-based photopolymerization initiators and acylphosphine oxide-based photopolymerization initiators are preferable from the viewpoint of good curing properties with respect to light-emitting diode (LED) light. The above photopolymerization initiators may be used alone, or two or more types may be combined.

Examples of these photopolymerization initiators may include bis(2,4,6-trimethylbenzoil)phenylphosphine oxide, ethoxy(2,4,6-trimethylbenzoil)phenylphosphine oxide, benzophenone, diethylthioxantone, 2-methyl-1-(4-methylthio)phenyl-2-morpholino propane-1-one, 4-benzoil-4'-methyldiphenyl sulfide, 1-chloro-4-propoxythioxanthone, isopropylthioxanthone, 2-hydroxy-2-methyl-1-phenylpropane-1-one, 1-hydroxycyclohexyl phenyl ketone, bis-2,6-dimethoxybenzoyl-2,4,4-trimethylpentylphosphine oxide, 1-[4-(2-hydroxyethoxy)-phenyl]-2-hydroxy-2-methyl-1-propane-1-one, 2,2-dimethyl-2-hydroxyacetphenone, 2,2-dimethoxy-2-phenylacetphenone, 2,4,6-trimethylbenzyl-diphenylphosphine oxide, and 2-benzyl-2-dimetylamino-1-(morpholinophenyl)-butane-1-one.

(Sensitizer) contain a sensitizer from the viewpoint of improving curing properties. The sensitizer may be used alone, or two or more types may be combined.

Examples of sensitizers may include anthracene-based sensitizers, such as 9,10-dibutoxyanthracene, 9,10-diethoxyanthracene, 9,10-dipropoxyanthracene, and 9,10-bis(2-ethylhexyloxy)anthracene; and thioxanthone-based sensitizers, such as 2,4-diethylthioxanthone, 2-4-diethylthioxanthen-9-one, 2-isopropylthioxanthone, and 4-isopropylthioxanthone. Among them, thioxanthone-based sensitizers are preferable. Examples of commercially available sensitizer products may include product names "DBA" and "DEA" which are anthracene-based sensitizers (Kawasaki Kasei Chemicals Ltd.), and product names "DETX" and "ITX" which are thioxanthone-based sensitizers (Lambson Ltd.).

A ratio of the sensitizer in the ink composition is preferably 5% by mass or less from the viewpoint of preventing excessive addition. It is possible to use thioxanthone-based sensitizers for magenta-based ink compositions as in the present invention.

It is preferable to contain 7.0 to 14.0% by mass of a photopolymerization initiator and/or a sensitizer relative to a total of all polymerizable components of the ink composition in the present invention. In the case of containing a photopolymerization initiator and sensitizer, the above ratio is a ratio of a total amount of both. In the case of containing either one alone, the above ratio is an independent ratio.

Coloring of Coating Film by Active Energy Ray-Curable Inkjet Ink Composition

When the active energy ray-curable inkjet ink composition of the present invention at 25° C. is used to form a solid pattern on a polyvinyl chloride sheet by a 0.1 mm bar coater under environment at 25° C., an OD value (optical density) of an ink coating film thereof is preferably 1.30 or more, and more preferably 1.33 or more.

Also, a b* value thereof is preferably 28.0 or more, more preferably 30.0 or more, and even more preferably 31.0 or more, and is also preferably 33.0 or less, more preferably 32.5 or less, and even more preferably 32.0 or less.

It should be noted that the OD value and the b* value are values obtained by color measurement using a spectrophotometer/concentration meter (X-Rite, Inc., eXact).

(Other Components)

The active energy ray-curable inkjey ink composition of the present invention may contain, as other components, various types of additives, such as surfactants, organic solvents, polymerization inhibitors, storability improving agents, UV absorbents, antioxidants, defoaming agents, antifungal agents, rustproofing agents, thickening agents, humectants, and pH-adjusting agents.

(Surfactant)

The active energy ray-curable inkjet printing ink composition of the present invention can use, depending on an inkjet head used, any known surfactants used for an active energy ray-curable inkjet printing ink composition without specific limitations, and examples thereof may include nonionic surfactants, cationic surfactants, anionic surfactants, and betaine surfactants. Specific examples of the above surfactants may include silicone-based surfactants, such as polyether-modified silicone oil, polyester-modified polydimethylsiloxane, polyester-modified methylalkylpolysiloxane, fluorine-based surfactant, and acetylene-based surfactants. The above surfactants may be used alone, or two or more types may be combined.

Examples of silicone-based surfactant may include BYK-307, BYK-315, BYK-331, BYK-333, BYK-347, BYK-348, BYK-349, BYK345, BYK-377, BYK-378, and BYK-3455 (BYK-Chemie GmbH).

Examples of fluorine-based surfactants may include F-410, F-444 and F-553 (DIC Corporation), and FS-65, FS-34, FS-35, FS-31, and FS-30 (DuPont de Nemours, Inc.).

Examples of acetylene-based surfactants may include Dynol 607, Dynol 609, OLFINE E1004, OLFINE E1010, OLFINE E1020, OLFINE PD-001, OLFINE PD-002W, OLFINE PD-004, OLFINE PD-005, OLFINE EXP.4001, OLFINE EXP.4200, OLFINE EXP.4123, and OLFINE EXP.4300 (Nissin Chemical Industry Co, LTD.), Surfynol 104E, Surfynol 104H, Surfynol 104A, Surfynol 104BC, Surfynol 104DPM, Surfynol 104PA, Surfynol 104PG-50, Surfynol 420, Surfynol 440, and Surfynol 465 (EVONIK OPERATIONS GMBH).

A ratio of the surfactant in the active energy ray-curable inkjet ink composition of the present invention is preferably 0.005% by mass or more, and more preferably 0.01% by mass or more from the viewpoint of reducing surface tension of the ink composition and enhancing discharge stability from the inkjet head, while it is preferably 1.5% by mass or less, and more preferably 1% by mass or less from the viewpoint of inhibiting foam in the ink composition generated during mixing, and enhancing discharge stability.

If a surface conditioner is contained, the content of the surface conditioner is not specifically limited, however, preferably the content is such that surface tension of the active energy ray-curable inkjet ink composition will become 22.0 to 30.0 mN/m, or more preferably the content is 0.10 to 1.50% by mass in the active energy ray-curable inkjet ink composition.

(Solvent)

A solvent can be incorporated as needed into the active energy ray-curable inkjet ink composition of the present invention. Examples of solvents may include ester-based organic solvents, ether-based organic solvents, ether ester-based organic solvents, ketone-based organic solvents, aromatic hydrocarbon solvent, and nitrogen-containing organic solvents. Examples of solvents may also include ones whose boiling point at a pressure of one atmosphere is 150 to 220° C. The solvent should be used as little as possible from the viewpoint of curing properties of the ink composition, environment concerns, etc. The ratio of the solvent is preferably 5% by mass or less, and more preferably 2% by mass or less in the ink composition.

<Additives>

It is possible to add various types of additives to the active energy ray-curable inkjet printing ink composition of the present invention in order to develop various types of functionalities as needed. Specifically, listed are surface conditioners, photostabilizers, surface treatment agents, antioxidants, antiaging agents, crosslinking promoters, polymerization inhibitors, plasticizers, preservatives, pH-adjusting agents, defoaming agents, humectants, and the like. Also, a resin that serves as a vehicle but is not curable may or may not be added. Also, a solvent may or may not be contained.

(Storability Improving Agent)

As a storability improving agent, it is possible to use hindered amines, such as N—CH$_3$ type, N—H type, and N—OR type.

(UV Absorbent)

Examples of UV absorbents include benzophenone-based UV absorbents, benzotriazole-based UV absorbents, salicylate-based UV absorbents, hydroxyphenyl triazine-based UV absorbents, cyanoacrylate-based UV absorbents, and nickel complex salt-based UV absorbents.

(Antioxidants)

Examples of antioxidants include phenol-based antioxidants, amine-based antioxidants, sulfur-based antioxidants, and phosphorus-based antioxidants.

(Defoaming Agent)

Examples of defoaming agents include silicone-based defoaming agents and Pluronic (registered trademark)-based defoaming agents.

Viscosity of the active energy ray-curable inkjet ink composition of the present invention at 25° C. is preferably 2000 cps or less, more preferably 30 cps or less, and even more preferably 10 cps or less. Viscosity modifiers, etc. are added as needed to the ink composition. It should be noted that viscosity mentioned in the present specification is viscosity measured under conditions of 25° C. and 20 rpm by using an E-type viscometer (RE100L type viscometer manufactured by Toki Sangyo Co., Ltd.).

Surface tension is preferably 20.0 to 25.0 mN/m.

<Preparation Method for Active Energy Ray-Curable Inkjet Ink Composition>

Next, a method for manufacturing the active energy ray-curable inkjet ink composition proposed by the present invention by using the above-discussed materials is explained.

The active energy ray-curable inkjet ink composition proposed by the present invention can be obtained by dispersing and mixing individual components using a disperser, such as a wet circulation mill, beads mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, GenusPY, DeBEE2000 etc.), and pearl mill, and adjusting the viscosity of the active energy ray-curable inkjet ink composition as necessary. It should be noted that the active energy ray-curable inkjet ink composition may be prepared by mixing a pigment, the pigment dispersant, and the aforementioned photopolymerizable monomer so as to obtain a pre-mixed base ink composition, and by adding the rest of the above components thereto so as to obtain a desired composition.

<Printing Method>

The method for printing using the active energy ray-curable inkjet ink composition of the present invention is explained.

The inkjet printing device used is not specifically limited, and, for example, there is a method with which the active energy ray-curable inkjet ink composition is supplied to a printer head of an inkjet recording printer device, the ink composition is discharged from the printer head to a substrate to be printed, and the ink composition landed on the base material is exposed to and cured by an active energy ray. Examples of the active energy ray may include ultraviolet rays, electron beams, and visible light irradiated from a light-emitting diode (LED), various types of lamps, and electrodes. It is particularly excellent in curing properties against ultraviolet rays whose light source is a light-emitting diode (LED).

Also, no particular limitation is imposed on base materials. That is, no particular limitation is imposed on base materials as long as a conventionally known energy ray-curable inkjet ink composition is applicable thereto. Examples of the base materials may include plastic, paper, capsules, gels, metal foil, glass, wood, and fabric. Examples of plastics may include polycarbonate, hard vinyl chloride, soft vinyl chloride, ABS, polyethylene, polyester, polypropylene, acrylic resin, and polystyrene.

The method for printing and curing the ink composition proposed by the present invention may specifically be a method whereby the ink composition proposed by the present invention is discharged onto a base material from an inkjet head, after which the coating film of the ink composition proposed by the present invention that has landed on the base material is exposed to light and thereby cured.

For example, discharging onto the base material (printing of image) may be implemented by supplying the ink composition of the present invention to a low-viscosity-compatible printer head of an inkjet recording printer, and then discharging the ink composition from the printer head in such a way that the coating film on the base material will have a film thickness of 1 to 60 µm, for example. Also, exposure to light and curing (curing of images) may be implemented by irradiating light onto the coating film of the ink composition of the present invention that has been applied on the base material as images.

For the inkjet recording printer device with which to print the ink composition of the present invention, any conventionally used inkjet recording printer device may be utilized. It should be noted that, if a continuous-type inkjet recording printer device is used, a conductivity-adding agent is further added to the ink composition proposed by the present invention to adjust its conductivity.

The light source used in the aforementioned curing of the coating film may be ultraviolet ray (UV), ultraviolet ray (light-emitting diode (LED)), electron beam, visible light, etc., where a light-emitting diode (LED) that generates ultraviolet ray with an emission peak wavelength in a range of 350 to 420 nm is preferred from an environmental aspect.

EXAMPLES

The present invention is explained in greater detail below by citing examples, but the present invention is not limited to these examples.

Active energy ray-curable inkjet ink compositions of Examples and Comparative Examples presented in the following Table 1 were prepared, and test results of these active energy ray-curable inkjet ink compositions are presented in Table 1. The terms used in Table 1 represent the following:

P. V. 19: Pigment Violet 19
P. R. 122: Pigment Red 122
P. R. 202: Pigment Red 202
P. O. 71: Pigment Orange 71
PX4701: Acrylic copolymer (EFKAPX4701, BASF SE)
S56000: Water-soluble polymeric dispersant (Solsperse S56000, Lubrizol Japan Ltd.)
BYKJET-9151: Water-soluble polymeric dispersant (BYKJET-9151, BYK-Chemie GmbH)
PB821: Ester-based dispersant (AjisperPB821, Ajinomoto Fine-Techno Co., Inc.)
CN371NS: Amine-modified(meth)acrylate oligomer (Sartomer CN371NS, Arkema K.K.
CN373: Amine-modified(meth)acrylate oligomer (Arkema K.K.
Agisyn008: Amine-modified(meth)acrylate oligomer (DSM-AGI Corporation)
Agisyn003: Amine-modified(meth)acrylate oligomer (DSM-AGI Corporation)
TPO: 2,4,6-trimethylbenzoil-diphenyl-phosphine oxide
DETX: 2,4-diethyl dioxanthone
MEHQ: Hydroquinone monomethyl ether
UV22: Quinone-based polymerization inhibitor (BASF SE)
BYK377: Solid content 100%, Polyether-modified siloxane surfactant (BYK-Chemie GmbH)

(Viscosity)

The active energy ray-curable inkjet ink compositions obtained in the Examples and Comparative Examples were measured for viscosity (cps) using a type-E viscometer (product name: RE100L Viscometer, manufactured by Toki Sangyo Co., Ltd.) under the conditions of 25° C. in temperature and 20 rpm in rotor speed.

(Surface Tension)

Each active energy ray-curable inkjet ink composition was measured for surface tension at a temperature of 25° C. using a dynamic wettability tester (product name: WET-6000) manufactured by RHESCA Co., Ltd.

(RED Color Development Property)
(Evaluation of Colored Coating Film) (OD value) (b*value)

OD values (optical densities) and L*a*b* values of cured coating films made under the same conditions as cured coating films made for testing adhesion discussed below were measured with a spectrophotometer/concentration meter eXact (manufactured by X-Rite, Inc.). Their respective measured values are presented in columns of OD value and b* value in Table 1.

Additionally, colored coating films were evaluated on the basis of the measured values of OD values and b* value according to the following standards.

O: Having an OD value of 1.30 or more and a b* value of 28 or more but 32 or less; and X: Having an OD value of less than 1.30, or a b* value of less than 28 or exceeding 32

(Adhesion)

The active energy ray-curable inkjet printing ink compositions obtained in Examples and Comparative Examples were applied using a #4 bar coater to various types of base materials (acryl(Acrylite L, Mitsubishi Rayon Co. Ltd.), PVC (vinyl chloride resin sheet) (PVC80, LINTEC Corporation), Polycarbonate (NF2000 white, Mitsubishi Gas Chemical Company, Inc.), and PS (polystyrene)), and irradiated twice using a UV-LED lamp manufactured by PhoseonTechnology under irradiation conditions of 2 cm in distance between the lamp and an ink-coated surface and one second per irradiation (UV accumulated light amount per second was 60 mJ/cm$^2$) to form a cured coating film.

The surface of the obtained cured coating film was crosscut with a cutter knife into 100 small square pieces of the cured coating film. A piece of cellulose tape (product name: CELLOTAPE (registered trademark), manufactured by Nichiban Co., Ltd.) was attached to the cut area and then peeled off, to count the number of small square pieces of film remaining on the base material without adhering to the cellulose tape and separating from the base. For example, "100/100" indicates that all of the small squares remain on the base material without separation of any square, while "20/100" indicates that 20 small squares remain on the base material, but 80 small squares have adhered to the cellulose tape and separated from the base material.

(Resistance)
(Pencil Hardness)

An evaluation of a pencil scratch test (pencil hardness) was conducted on the surface of the cured coating film obtained for an adhesion test according to JIS K5600-5-4.

(Rub Resistance)

The active energy ray-curable inkjet printing ink compositions obtained in Examples and Comparative Examples were applied with a #4 bar coater to PVC80 (LINTEC Corporation). These were then subjected to irradiation twice using a UV-LED lamp manufactured by PhoseonTechnology while keeping a distance of 2 cm between the lamp and an ink-coated surface under irradiation conditions where irradiation time was one second per irradiation (UV accumulated light amount per second was 60 mJ/cm$^2$), thereby forming a cured coating film.

Using a Gakushin-type rubbing tester (manufactured by DAIEI KAGAKU SEIKI MFG. Co., Ltd.), this cured coating film was rubbed with a bleached cloth in a manner of 500 g×50 times, and the degree of separation of the cured coating film on the PVC80 (manufactured by LINTEC Corporation) was visually observed to make an evaluation according to the following standards.

O: The cured coating film did not separate even by being rubbed 50 times or more;

Δ: The cured coating film separated by being rubbed 10 to 49 times; and

X: The cured coating film separated by being rubbed 1 to 9 times.

(Water Resistance)

Using a Gakushin-type rubbing tester (manufactured by DAIEI KAGAKU SEIKI MFG. Co., Ltd.), the same cured coating film as the cured coating film used for evaluation of rub resistance was rubbed with a bleached cloth impregnated with five drops of water in a manner of 200 g×50 times, and the degree of separation of the cured coating film on the PVC80 (manufactured by LINTEC Corporation) was visually observed to make an evaluation according to the following standards.

O: The cured coating film did not separate even by being rubbed 50 times or more;

Δ: The cured coating film separated by being rubbed 10 to 49 times; and

X: The cured coating film separated by being rubbed 1 to 9 times.

(LED Curing Properties)

The inkjet recording device and the active energy ray-curable inkjet ink compositions were left to stand at an atmospheric temperature of 25° C. for 24 hours, so that the inkjet recording apparatus and the ink compositions had a temperature of 25° C. Thereafter, the active energy ray-curable inkjet ink compositions were applied at 25° C. with a #4 bar coater onto PVC80 (manufactured by LINTEC Corporation), followed by curing with a UV-LED lamp manufactured by PhoseonTechnology.

Curing properties when using the UV-LED lamp was evaluated with the following method. The results are presented in Table 1.

(Curing Properties When Using UV-LED Lamp)

An evaluation was made based on an accumulated amount of irradiation energy until tackiness on the surface was not detected under irradiation conditions where a UV-LED lamp manufactured by PhoseonTechnology was used while keeping a distance of 2 cm between the lamp and an ink coated surface, and irradiation time was one second per irradiation (UV accumulated light amount per second was 60 mJ/cm$^2$).

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Pigment | P.V. 19 | 2.50% | 3.50% | 1.50% | 2.50% | 2.50% | 2.50% | 2.50% | 2.50% | 2.50% |
| | P.R. 122 | | | | | | | | | |
| | P.R. 202 | | | | | | | | | |
| | P.O. 71 | 1.80% | 0.80% | 2.80% | 1.80% | 1.80% | 1.80% | 1.80% | 1.80% | 1.80% |
| Dispersant | PX4701 | 1.30% | 1.40% | 1.40% | 1.30% | 1.30% | 1.30% | 1.30% | 1.30% | 1.30% |
| | S56000 | | | | | | | | | |
| | BYKJET-9151 | 0.72% | 0.62% | 0.62% | 0.72% | 0.72% | 0.72% | 0.72% | 0.72% | 0.72% |
| | PB821 | | | | | | | | | |
| Amine-modified oligomer | CN371NS | 0.50% | 0.50% | 0.50% | 0.20% | 12.00% | 0.50% | 0.50% | 0.50% | 0.50% |
| | CN373 | | | | | | | | | |
| | Agisyn008 | | | | | | | | | |
| | Agisyn003 | | | | | | | | | |
| Ethylcaribitol acrylate | | 19.98% | 19.98% | 19.98% | 19.98% | 19.98% | 19.98% | 19.98% | 19.98% | 19.98% |
| Benzyl acrylate | | 23.48% | 23.48% | 23.48% | 23.78% | 11.98% | 25.48% | 18.48% | 25.48% | 18.48% |
| Isobornyl acrylate | | 22.42% | 22.42% | 22.42% | 22.42% | 22.42% | 22.42% | 22.42% | 22.42% | 22.42% |
| Cyclic trimethylolpropane formal acrylate | | | | | | | | | | |
| Trimethylolpropane EO (3) modified triacrylate | | 4.00% | 4.00% | 4.00% | 4.00% | 4.00% | 2.00% | 9.00% | 4.00% | 4.00% |
| Trimethylolpropane triacrylate | | | | | | | | | | |
| DPGDA (dipropylene glycol) diacrylate | | | | | | | | | | |
| Acryloylmorpholine | | | | | | | | | | |
| Vinylcaprolactam | | 12.50% | 12.50% | 12.50% | 12.50% | 12.50% | 12.50% | 12.50% | 10.50% | 17.50% |
| Initiator | TPO | 7.50% | 7.50% | 7.50% | 7.50% | 7.50% | 7.50% | 7.50% | 7.50% | 7.50% |
| Sensitizer | DETX | 1.00% | 1.00% | 1.00% | 1.00% | 1.00% | 1.00% | 1.00% | 1.00% | 1.00% |
| Polymerization inhibitor (methoquinone) | MEHQ | 1.90% | 1.90% | 1.90% | 1.90% | 1.90% | 1.90% | 1.90% | 1.90% | 1.90% |
| Polymerization inhibitor | UV22 | 0.20% | 0.20% | 0.20% | 0.20% | 0.20% | 0.20% | 0.20% | 0.20% | 0.20% |
| Leveling agent | BYK377 | 0.20% | 0.20% | 0.20% | 0.20% | 0.20% | 0.20% | 0.20% | 0.20% | 0.20% |
| Total | | 100.00% | | | | | | | | |
| Specific weight | | 1.07 | 1.07 | 1.07 | 1.07 | 1.07 | 1.07 | 1.07 | 1.07 | 1.06 |
| Viscosity | cps@25° C. | 8.1 | 6.4 | 6.4 | 6.2 | 9.8 | 6.2 | 7.0 | 6.3 | 6.1 |
| Surface tension | mN/m | 23.2 | 23.3 | 23.3 | 23.4 | 23.3 | 23.4 | 23.3 | 23.4 | 23.3 |
| RED color development property | Evaluation of colored coating film | ○ | ○ | ○ | ○ | ○ | ○ | ○ | ○ | ○ |
| | OD value | 1.35 | 1.34 | 1.33 | 1.33 | 1.34 | 1.33 | 1.35 | 1.33 | 1.34 |
| | b* value | 29.8 | 28.8 | 31.8 | 31.5 | 31.3 | 31.2 | 31.1 | 30.9 | 31.1 |
| Adhesion | Acryl | 100/100 | 100/100 | 100/100 | 100/100 | 100/100 | 100/100 | 100/100 | 100/100 | 100/100 |
| | PVC | 100/100 | 100/100 | 100/100 | 100/100 | 100/100 | 100/100 | 100/100 | 100/100 | 100/100 |
| | Polycarbonate | 100/100 | 100/100 | 100/100 | 100/100 | 100/100 | 100/100 | 100/100 | 100/100 | 100/100 |
| | PS | 100/100 | 100/100 | 100/100 | 100/100 | 100/100 | 100/100 | 100/100 | 100/100 | 100/100 |
| Resistance | Pencil hardness | 2H | 2H | 2H | 2H | 2H | 2H | 3H | 2H | 2H |
| | Rub resistance | ○ | ○ | ○ | ○ | ○ | ○ | ○ | ○ | ○ |
| | Water resistance | ○ | ○ | ○ | ○ | ○ | ○ | ○ | ○ | ○ |
| LED curing properties | | ○ | ○ | ○ | ○ | ○ | ○ | ○ | ○ | ○ |

| | | Examples | | | | | Comparative Examples | | | |
|---|---|---|---|---|---|---|---|---|---|---|
| | | 10 | 11 | 12 | 13 | 14 | 1 | 2 | 3 | 4 |
| Pigment | P.V. 19 | 2.50% | 2.50% | 2.50% | 2.50% | 2.50% | 1.00% | 4.00% | | |
| | P.R. 122 | | | | | | | | 2.50% | |
| | P.R. 202 | | | | | | | | | 2.50% |
| | P.O. 71 | 1.80% | 1.80% | 1.80% | 1.80% | 1.80% | 3.30% | 0.30% | 1.80% | 1.80% |
| Dispersant | PX4701 | 1.30% | 1.30% | 1.30% | 1.30% | 1.30% | 0.70% | 1.90% | 2.02% | 2.02% |
| | S56000 | | | | | | | | | |
| | BYKJET-9151 | 0.72% | 0.72% | 0.72% | 0.72% | 0.72% | 1.32% | 0.12% | | |
| | PB821 | | | | | | | | | |
| Amine-modified oligomer | CN371NS | 0.50% | | | | 0.50% | 0.50% | 0.50% | 0.50% | 0.50% |
| | CN373 | | 0.50% | | | | | | | |
| | Agisyn008 | | | 0.50% | | | | | | |
| | Agisyn003 | | | | 0.50% | | | | | |
| Ethylcaribitol acrylate | | 19.98% | 19.98% | 19.98% | 19.98% | 19.98% | 19.98% | 19.98% | 19.98% | 19.98% |
| Benzyl acrylate | | 23.48% | 23.48% | 23.48% | 23.48% | 18.48% | 23.48% | 23.48% | 23.48% | 23.48% |
| Isobornyl acrylate | | | 22.42% | 22.42% | 22.42% | 22.42% | 22.42% | 22.42% | 22.42% | 22.42% |
| Cyclic trimethylolpropane formal acrylate | | 22.42% | | | | | | | | |

TABLE 1-continued

| | | | | | | | | | | |
|---|---|---|---|---|---|---|---|---|---|---|
| Trimethylolpropane EO (3) modified triacrylate | | 4.00% | 4.00% | 4.00% | 4.00% | 4.00% | 4.00% | 4.00% | 4.00% | 4.00% |
| Trimethylolpropane triacrylate | | | | | | | | | | |
| DPGDA (dipropylene glycol) diacrylate | | | | | | | | | | |
| Acryloylmorpholine | | | | | | 5.00% | | | | |
| Vinylcaprolactam | | 12.50% | 12.50% | 12.50% | 12.50% | 12.50% | 12.50% | 12.50% | 12.50% | 12.50% |
| Initiator | TPO | 7.50% | 7.50% | 7.50% | 7.50% | 7.50% | 7.50% | 7.50% | 7.50% | 7.50% |
| Sensitizer | DETX | 1.00% | 1.00% | 1.00% | 1.00% | 1.00% | 1.00% | 1.00% | 1.00% | 1.00% |
| Polymerization inhibitor (methoquinone) | MEHQ | 1.90% | 1.90% | 1.90% | 1.90% | 1.90% | 1.90% | 1.90% | 1.90% | 1.90% |
| Polymerization inhibitor | UV22 | 0.20% | 0.20% | 0.20% | 0.20% | 0.20% | 0.20% | 0.20% | 0.20% | 0.20% |
| Leveling agent | BYK377 | 0.20% | 0.20% | 0.20% | 0.20% | 0.20% | 0.20% | 0.20% | 0.20% | 0.20% |
| Total | | | | | | 100.00% | | | | |
| Specific weight | | 1.07 | 1.07 | 1.07 | 1.07 | 1.07 | 1.07 | 1.07 | 1.07 | 1.07 |
| Viscosity | cps@25° C. | 7.8 | 6.0 | 8.1 | 5.8 | 6.8 | 6.0 | 14.3 | 7.1 | 9.8 |
| Surface tension | mN/m | 23.3 | 23.4 | 23.2 | 23.4 | 23.4 | 23.2 | 23.2 | 23.1 | 23.1 |
| RED color development property | Evaluation of colored coating film | ○ | ○ | ○ | ○ | ○ | X | X | X | X |
| | OD value | 1.33 | 1.33 | 1.35 | 1.33 | 1.34 | 1.25 | 1.33 | 1.30 | 1.28 |
| | b*value | 30.8 | 31.5 | 29.8 | 31.5 | 31.3 | 35.5 | 25.1 | 24.8 | 24.2 |
| Adhesion | Acryl | 100/100 | 100/100 | 100/100 | 100/100 | 100/100 | 100/100 | 100/100 | 100/100 | 0/100 |
| | PVC | 100/100 | 100/100 | 100/100 | 100/100 | 100/100 | 100/100 | 100/100 | 100/100 | 0/100 |
| | Polycarbonate | 100/100 | 100/100 | 100/100 | 100/100 | 100/100 | 100/100 | 100/100 | 100/100 | 0/100 |
| | PS | 100/100 | 100/100 | 100/100 | 100/100 | 100/100 | 100/100 | 100/100 | 100/100 | 0/100 |
| Resistance | Pencil hardness | 2H | 2H | 2H | 2H | 2H | 2H | 2H | 2H | 2H |
| | Rub resistance | ○ | ○ | ○ | ○ | ○ | ○ | ○ | ○ | ○ |
| | Water resistance | ○ | ○ | ○ | ○ | ○ | ○ | ○ | ○ | ○ |
| LED curing properties | | ○ | ○ | ○ | ○ | ○ | ○ | ○ | ○ | ○ |

| | | Comparative Examples | | | | | | | |
|---|---|---|---|---|---|---|---|---|---|
| | | 5 | 6 | 7 | 8 | 9 | 10 | 11 | 12 |
| Pigment | P.V. 19 | | | | | | | | |
| | P.R. 122 | | | | | | | | |
| | P.R. 202 | | | | | | | | |
| | P.O. 71 | 2.50% | 2.50% | 2.50% | 2.50% | 2.50% | 2.50% | 2.50% | 2.50% |
| Dispersant | PX4701 | 1.80% | 1.80% | 1.80% | 1.80% | 1.80% | 1.80% | 1.80% | 1.80% |
| | S56000 | 1.30% | 1.30% | 1.30% | 1.30% | 1.30% | 1.30% | 1.30% | 1.30% |
| | BYKJET-9151 | | | | | | | | |
| | PB821 | 0.72% | 0.72% | 0.72% | 0.72% | 0.72% | 0.72% | 0.72% | 0.72% |
| Amine-modified oligomer | CN371NS | 0.00% | 15.00% | 0.50% | 0.50% | 0.50% | 0.50% | 0.50% | 0.50% |
| | CN373 | | | | | | | | |
| | Agisyn008 | | | | | | | | |
| | Agisyn003 | | | | | | | | |
| Ethylcaribitol acrylate | | 19.98% | 19.98% | 19.98% | 19.98% | 19.98% | 19.98% | 19.98% | 19.98% |
| Benzyl acrylate | | 23.98% | 8.98% | 27.48% | 13.48% | 29.48% | 13.48% | 23.48% | 23.48% |
| Isobornyl acrylate | | 22.42% | 22.42% | 22.42% | 22.42% | 22.42% | 22.42% | 22.42% | 22.42% |
| Cyclic trimethylolpropane formal acrylate | | | | | | | | | |
| Trimethylolpropane EO (3) modified triacrylate | | 4.00% | 4.00% | 0.00% | 14.00% | 4.00% | 4.00% | | |
| Trimethylolpropane triacrylate | | | | | | | | 4.00% | |
| DPGDA (dipropylene glycol) diacrylate | | | | | | | | | 4.00% |
| Acryloylmorpholine | | | | | | | | | |
| Vinylcaprolactam | | 12.50% | 12.50% | 12.50% | 12.50% | 6.50% | 22.50% | 12.50% | 12.50% |
| Initiator | TPO | 7.50% | 7.50% | 7.50% | 7.50% | 7.50% | 7.50% | 7.50% | 7.50% |
| Sensitizer | DETX | 1.00% | 1.00% | 1.00% | 1.00% | 1.00% | 1.00% | 1.00% | 1.00% |
| Polymerization inhibitor (methoquinone) | MEHQ | 1.90% | 1.90% | 1.90% | 1.90% | 1.90% | 1.90% | 1.90% | 1.90% |
| Polymerization inhibitor | UV22 | 0.20% | 0.20% | 0.20% | 0.20% | 0.20% | 0.20% | 0.20% | 0.20% |
| Leveling agent | BYK377 | 0.20% | 0.20% | 0.20% | 0.20% | 0.20% | 0.20% | 0.20% | 0.20% |
| Total | | | | | | 100.00% | | | |
| Specific weight | | 1.07 | 1.07 | 1.07 | 1.07 | 1.07 | 1.07 | 1.07 | 1.07 |
| Viscosity | cps@25° C. | 6.0 | 12.5 | 6.1 | 8.0 | 6.4 | 7.0 | 7.5 | 7.2 |
| Surface tension | mN/m | 23.3 | 23.5 | 23.3 | 23.3 | 23.2 | 23.3 | 23.4 | 23.3 |

TABLE 1-continued

| RED color development property | Evaluation of colored coating film | ○ | ○ | ○ | ○ | ○ | ○ | ○ | ○ |
|---|---|---|---|---|---|---|---|---|---|
| | OD value | 1.31 | 1.33 | 1.34 | 1.33 | 1.34 | 1.35 | 1.33 | 1.34 |
| | b*value | 30.9 | 31.1 | 31.0 | 31.0 | 31.1 | 30.9 | 31.1 | 31.0 |
| Adhesion | Acryl | 0/100 | 0/100 | 0/100 | 70/100 | 0/100 | 70/100 | 10/100 | 20/100 |
| | PVC | 0/100 | 0/100 | 0/100 | 90/100 | 0/100 | 90/100 | 30/100 | 30/100 |
| | Polycarbonate | 0/100 | 0/100 | 0/100 | 20/100 | 0/100 | 20/100 | 30/100 | 10/100 |
| | PS | 0/100 | 0/100 | 0/100 | 10/100 | 0/100 | 10/100 | 10/100 | 20/100 |
| Resistance | Pencil hardness | 2H | 2H | 3B | 3H | 2H | 2H | 2H-3H | 2H-3H |
| | Rub resistance | ○ | ○ | X | ○ | ○ | ○ | ○ | ○ |
| | Water resistance | ○ | ○ | X | ○ | ○ | ○ | ○ | ○ |
| LED curing properties | | X | ○ | ○ | ○ | X | ○ | ○ | ○ |

Examples that are embodiments of the present invention had viscosity in a suitable range and were excellent in RED color development properties, adhesion to various types of base materials, resistance properties, and LED curing properties as an active energy ray-curable inkjet ink composition.

In contrast, Comparative Examples 1 and 2, in which Pigment Violet 19 was not 30.0 to 85.0% by mass relative to a total mass of Pigment Violet 19 and Pigment Orange 71, exhibited particularly poor evaluation results of the colored coating film. Comparative Examples 3 and 4 using neither Pigment Violet 19 nor Pigment Orange 71 caused deterioration in entire RED color development properties.

Furthermore, Comparative Example 5 not containing (A) a multifunctional amine-modified oligomer, exhibited poor adhesion to various types of base materials, and poor LED curing properties. According to Comparative Example 6 containing an excessive amount of (A) multifunction amine-modified oligomer, the active energy ray-curable inkjet ink composition became highly viscous, and adhesion to various types of base materials was also inferior.

Comparative Example 7 not containing (E) a multifunctional monomer whose glass transition temperature was 10° C. or less had poor adhesion to various types of base materials, and poor rub resistance and water resistance. Comparative Example 8 containing an excessive amount of (E) a multifunctional monomer whose glass transition temperature was 10° C. or less had insufficient adhesion to various types of base materials.

Comparative Example 9 having a small content of vinylcaprolactam (N-vinylcaprolactam) as (F) a nitrogen-containing monofunctional monomer had poor adhesion to various types of base materials, and poor LED curing properties. Comparative Example 10 having a large content of (F) a nitrogen-containing monofunctional monomer had insufficient adhesion to various types of base materials.

Comparative Examples 11 and 12, which did not contain (E) a multifunctional monomer whose glass transition temperature was 10° C. or less, but contained a multifunctional monomer whose glass transition temperature was too high, had insufficient adhesion to various types of base materials.

What is claimed:

1. An active energy ray-curable inkjet ink composition comprising a pigment, a pigment dispersant, and a photopolymerizable compound, wherein the pigment contains Pigment Violet 19 and Pigment orange 71, and Pigment Violet 19 is 30.0 to 85.0% by mass relative to a total mass of Pigment Violet 19 and Pigment Orange 71, and the photopolymerizable compound satisfies all of the following requirements (A) to (F):

(A) a multifunctional amine-modified oligomer is contained by 0.20 to 15.0% by mass in a total amount of all polymerizable components;
(B) a monofunctional monomer is contained by 50.0% by mass or more in the total amount of all polymerizable components;
(C) a monofunctional monomer whose glass transition temperature is 20° C. or more is contained by 35.0% by mass or more in the total amount of all polymerizable components;
(D) a monofunctional monomer whose glass transition temperature is 10° C. or less is contained by 35.0% by mass or more in the total amount of all polymerizable components;
(E) a multifunctional monomer whose glass transition temperature is 10° C. or less is contained by 2.0 to 11.0% by mass in the total amount of all polymerizable components; and
(F) a nitrogen-containing monofunctional monomer is contained by 10.0 to 25.0% by mass in the total amount of all polymerizable components.

2. The active energy ray-curable inkjet ink composition according to claim 1, wherein (A) the multifunctional amine-modified oligomer is a bifunctional amine-modified oligomer and has a viscosity of 2000 cps or less at 25° C.

3. The active energy ray-curable inkjet ink composition according to claim 1, wherein (F) the nitrogen-containing monofunctional monomer is at least one selected from the group consisting of vinylcaprolactam, N,N-dimethylacrylamide, vinyl methyl oxazolidinone, and acryloylmorpholine.

4. The active energy ray-curable inkjet ink composition according to claim 2, wherein (F) the nitrogen-containing monofunctional monomer is at least one selected from the group consisting of vinylcaprolactam, N,N-dimethylacrylamide, vinyl methyl oxazolidinone, and acryloylmorpholine.

5. The active energy ray-curable inkjet ink composition according to claim 1, which has an OD value of 1.30 or more and a b* value of 28.0 to 32.0 as measured when an ink coating film is provided in a solid pattern formed by color-coating with a #4 bar coater or by inkjet printing.

6. The active energy ray-curable inkjet ink composition according to claim 2, which has an OD value of 1.30 or more and a b* value of 28.0 to 32.0 as measured when an ink coating film is provided in a solid pattern formed by color-coating with a #4 bar coater or by inkjet printing.

7. The active energy ray-curable inkjet ink composition according to claim 3, which has an OD value of 1.30 or more and a b* value of 28.0 to 32.0 as measured when an ink coating film is provided in a solid pattern formed by color-coating with a #4 bar coater or by inkjet printing.

8. The active energy ray-curable inkjet ink composition according to claim 4, which has an OD value of 1.30 or more and a b* value of 28.0 to 32.0 as measured when an ink coating film is provided in a solid pattern formed by color-coating with a #4 bar coater or by inkjet printing.

* * * * *